3,105,023
Patented Sept. 24, 1963

3,105,023
ELECTROCHEMICAL MANUFACTURE OF CYANOGEN HALIDES
Robert W. Foreman, Chagrin Falls, and Franklin Veatch, Lyndhurst, Ohio, assignors to The Standard Oil Company, Cleveland, Ohio, a corporation of Ohio
No Drawing. Filed Mar. 14, 1961, Ser. No. 95,479
7 Claims. (Cl. 204—101)

The present invention relates to an electrochemical process for the manufacture of cyanogen halides. More particularly, the invention is concerned with the electrochemical reaction of hydrogen cyanide and an ammonium halide to give the corresponding cyanogen halide.

The cyanogen halides produced by the process of this invention may be converted to cyanamide by reaction with ammonia. Cyanamide is an important commercial chemical and one of its important uses is in the manufacture of melamine.

In brief, the process of this invention comprises the step of subjecting an aqueous solution containing hydrogen cyanide and an ammonium halide selected from the group consisting of ammonium bromide and ammonium chloride to the action of a direct electric current in a divided electrolytic cell. In order to carry out the process of this invention it is essential that the electrolytic cell be divided by an ion-permeable membrane. The products of this process are the cyanogen halide, ammonia and hydrogen.

The exact structure of the electrolytic cell which is employed in carrying out the process of this invention is relatively unimportant and any convenient structure may be employed. A particularly convenient structure is the so-called sandwich-type cell in which flat rectangular plates are sandwiched together so as to form one or more individual electrolytic cells. The piping and auxiliary equipment may be arranged so that the feed to the cells will flow either serially or in parallel through the individual cells. The spacing of the plates in the cell is of some importance but generally spacings of $1/16$ inch to $1\frac{1}{2}$ inches have been found to be satisfactory, and a cell spacing of about $\frac{1}{4}$ inch seems to give the best results. The cells may be constructed of any material which is impervious to the chemicals involved in the reaction. For example, the cathode may be conveniently constructed of materials such as carbon steel, iron, copper and Monel. In some instances, it may be desirable to construct the cathode from a porous metal which will facilitate the removal of the gases which collect at the cathode surface during the course of the reaction. The composition of the anode is, of course, controlled primarily by the necessity that it be resistant to chemical reaction with bromine but a variety of materials are available which meet this desideratum such as graphite, carbon, platinum and titanium.

Ion-permeable membranes of the type which are employed to divide the electrolytic cell used in carrying out the process of this invention may be defined as those membranes which are electrically conductive and permeable to ions, but which are not permeable to non-ionic molecules. The more sophisticated ion-permeable membranes are known as permselective membranes, i.e., they are permeable to ions of a given charge but not to ions having the opposite charge. Hence, they are referred to as cationic or anionic, as the case may be, and both types are useful in connection with this invention. For the purposes of this invention, those membranes which have ion-exchange properties are preferred because they will give the maximum current flow in terms of ions and also because the ion-exchange membranes exhibit maximum resistance to the flow of the non-ionics such as ammonia, hydrogen cyanide, cyanogen halide and water.

The preparation and description of the permselective membranes is well-known in the art and there are numerous patents relating to such membranes. Examples of such membranes are described in U.S. Patents 2,636,851; 2,636,852; 2,681,319; 2,681,320; 2,702,272; 2,730,768; 2,731,408; 2,731,411; 2,731,425; 2,732,351; 2,756,202; 2,780,604; 2,800,445; 2,820,756; 2,827,426; 2,858,264; 2,860,096; 2,860,097; 2,867,575; 2,894,289; 2,903,406; 2,957,206. Any of the membranes disclosed in the patents in the foregoing list may be employed in carrying out the process of this invention. The durability of the membranes will, of course, vary depending upon their chemical composition but this affects only the length of time which will transpire before replacement is necessary.

As for the conditions under which the cell is operated, it has been found that currents in the range of 10 to 1000 amps/sq. ft. are satisfactory and the preferred range is 30 to 500 amps/sq. ft. The cell may be operated at voltages in the range of 2 to 6 volts, and the preferred voltage range is about 3 to about 4. In general, the quantity of current employed in the reaction is determined on the basis of the amount of hydrogen cyanide in the feed and we have found that $1\frac{1}{2}$ to 3 faradays per mole of hydrogen cyanide gives quite satisfactory results. The cell is usually operated at about atmospheric pressure and while higher pressures are operable, there is in general no advantage to such higher pressures since some of the products of the reaction are gaseous. When operating at atmospheric pressure the preferred temperature range is about 20° C. to about 50° C. The membranes employed to divide the cell are in general quite sensitive to temperature and consequently the upper temperature limit at which the reaction may be carried out will usually be determined by the thermal stability of the membrane employed in the cell. However, most membranes exhibit quite satisfactory physical stability at temperatures in the preferred range, namely, 20 to 50° C.

The process may be carried out on either a batch or a continuous basis. However, a continuous process requires a smaller capital investment and, for this reason, continuous operation of the process is preferred. Unreacted feed materials in the process effluent may be separated and recycled to the process, if desired. Another optional feature of the process involves the recirculation of the liquids in both the anode and cathode compartments in order to improve current efficiency.

In general, the conversion of hydrogen cyanide obtained by means of this process is substantially quantitative and the yield of the cyanogen halide based on the hydrogen cyanide converted will usually be above 65%.

As mentioned heretofore, both ammonium bromide and ammonium chloride may be used as raw materials in this process. However, electrochemical considerations dictate a preference for the ammonium bromide since the chloride ion discharge potential is close to that of the discharge potential for the hydroxyl ion and this may lead to evolution of oxygen at the anode. If oxygen is evolved at the anode, it may attack destructively the anode which is, of course, undesirable. On the other hand, if the bromide is employed, the danger of oxygen evolution is minimized and, for this reason, ammonium bromide is preferred as a feed material.

In the operation of the cell, hydrogen cyanide is always introduced into the anode compartment since it is at the anode that the cyanogen halide is formed. Ammonium bromide, which serves as the electrolyte, will be present in both the anode and cathode compartments. If desired, supplementary electrolytes may be added to the cell. Examples of such supplemental electrolytes are sulfates, nitrates, phosphates, chlorides, fluosilicates and similar compounds which do not react under the process conditions.

Feed to the process comprises water, hydrogen cyanide and the ammonium halide, plus any supplementary electrolytes which may be added. In general, the feed should comprise at least 50 to 95 weight percent water, 0.1 to 10 weight percent hydrogen cyanide and 5 to 40 weight percent ammonium halide. A preferred feed composition would have a composition falling within the following ranges.

| Ingredient: | Wt. percent |
| --- | --- |
| Water | 57.5–77 |
| Hydrogen cyanide | 1.0–3.5 |
| Ammonium halide | 22–40 |

The molar ratio of hydrogen cyanide to ammonium halide in the feed is the most important variable and it should be within the range of 1:1 to 1:20.

Recovery of the desired product of the process, namely, the cyanogen halide, is relatively simple and it may be accomplished by any conventional means such as, for example, extraction or distillation. When distillation is employed to recover cyanogen bromide, the cyanogen bromide will distill off overhead and condense as a white crystalline solid.

The following examples are illustrative of a preferred embodiment of the process of this invention.

Example I

An experiment was carried out in a sandwich-type cell of the conventional plate and frame type. The anode was constructed of carbon and the cathode was steel. The effective surface area of the electrode was one square foot and the electrodes were spaced apart a distance of ⅛ inch. The cell was divided by a cation exchange membrane which was disposed in the cell equidistantly from the cathode and anode. The cation exchange membrane was prepared in the following manner:

A mixture of about 95 parts by weight of styrene and about 5 parts by weight divinyl benzene was polymerized. The resulting polymer was comminuted to fine particles and 100 parts by weight of this finely-divided material was sulfonated by reaction with about 175 parts by weight of chlorosulfonic acid. The latter reaction was carried out by heating at reflux temperature for about 3 minutes and then maintaining the mixture at room temperature for 50 hours. The sulfonated product was then washed with a large excess of water to remove any remaining chlorosulfonic acids and any acid chlorides which were formed in the reaction. The sulfonated resin was then dried and 2 parts by weight of the dried resin were mixed with 1 part by weight of polyethylene and the resulting mixture was pressed into a sheet which then serves as the membrane.

During the run the cell was operated at 3.2 volts and a current density of 100 amps/sq. ft. Fresh feed was introduced to the cell at the rate of about 49 ml. per minute and the feed had the following composition.

| Ingredient: | Wt. percent |
| --- | --- |
| Water | 72.6 |
| Hydrogen cyanide | 2.4 |
| Ammonium bromide | 25.0 |

After the cell reached equilibrium, analysis of the cell effluent showed that 89% of the hydrogen cyanide introduced into the cell was converted to cyanogen bromide and calculations revealed that the current efficiency of the cell was 92%.

Example II

In another run in which everything was the same except that ammonium chloride was substituted for the ammonium bromide in the feed, the yield of cyanogen chloride was 70% based on the hydrogen cyanide consumed and the current efficiency was 65%.

It will be apparent from the foregoing examples that the process of this invention provides an advantageous method for the manufacture of a cyanogen halide directly from hydrogen cyanide. It will be obvious to those skilled in the art that many modifications of this process may be made without departing from the spirit and scope of this invention. For example, materials such as cellophane may be employed as the ion-permeable membrane and the cell may be constructed of concentric tubes rather than the sandwich-type construction described above. However, this application for Letters Patent is intended to cover all such modifications as would reasonably fall within the scope of the appended claims.

We claim:

1. A process for the manufacture of a cyanogen halide comprising the step of subjecting a solution of hydrogen cyanide and an ammonium halide selected from the group consisting of ammonium bromide and ammonium chloride to the action of a direct electric current in an electrolytic cell in which the cathode and anode compartments are divided by a permeable membrane.

2. A process for the manufacture of a cyanogen halide comprising the step of subjecting a solution of hydrogen cyanide and an ammonium halide selected from the group consisting of ammonium bromide and ammonium chloride to the action of a direct electric current in an electrolytic cell in which the cathode and anode compartments are divided by an ion-permeable membrane.

3. A process for the manufacture of a cyanogen halide comprising the step of subjecting a solution of hydrogen cyanide and an ammonium halide selected from the group consisting of ammonium bromide and ammonium chloride to the action of a direct elecrtic current in an electrolytic cell in which the cathode and anode compartments are divided by a permeable membrane comprising an ion exchange resin.

4. A process for the manufacture of a cyanogen halide comprising the step of subjecting an aqueous solution of hydrogen cyanide and an ammonium halide selected from the group consisting of ammonium bromide and ammonium chloride to the action of a direct electric current in an electrolytic cell in which the cathode and anode compartments are divided by a permeable membrane.

5. A process for the manufacture of a cyanogen bromide comprising the step of subjecting an aqueous solution of hydrogen cyanide and ammonium bromide to the action of a direct electric current in an electrolytic cell in which the cathode and anode compartments are divided by an ion-permeable membrane.

6. A process for the manufacture of a cyanogen bromide comprising the step of subjecting an aqueous solution of hydrogen cyanide and ammonium bromide to the action of a direct electric current in an electrolytic cell in which the cathode and anode compartments are divided by a permeable membrane comprising an ion exchange resin.

7. A process for the manufacture of a cyanogen chloride comprising the step of subjecting an aqueous solution of hydrogen cyanide and ammonium chloride to the action of a direct electric current in an electrolytic cell in which the cathode and anode compartments are divided by an ion-permeable membrane.

References Cited in the file of this patent

UNITED STATES PATENTS

| | | |
|---|---|---|
| 641,571 | Witter | Jan. 16, 1900 |
| 914,251 | Ellis et al. | Mar. 2, 1909 |
| 2,793,991 | Hutchings | May 28, 1957 |
| 2,921,005 | Bodamer | Jan. 12, 1960 |

FOREIGN PATENTS

| | | |
|---|---|---|
| 2,660 of 1895 | Great Britain | Jan. 18, 1896 |

OTHER REFERENCES

Allen: "Organic Electrode Processes," published by Chapman & Hall Ltd., London, pages 31–33.